United States Patent
Kim et al.

(10) Patent No.: US 9,912,725 B2
(45) Date of Patent: Mar. 6, 2018

(54) METHOD AND APPARATUS FOR PROVIDING APPLICATION SERVICE, AND SYSTEM FOR PROVIDING THE SAME

(71) Applicant: Samsung Electronics Co., Ltd., Gyeonggi-do (KR)

(72) Inventors: Byung-Soo Kim, Gyeonggi-do (KR); Jin-Hyun Sin, Seoul (KR); Yeon-Shik Shin, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 734 days.

(21) Appl. No.: 14/459,447

(22) Filed: Aug. 14, 2014

(65) Prior Publication Data

US 2014/0359002 A1 Dec. 4, 2014

Related U.S. Application Data

(63) Continuation of application No. 13/220,820, filed on Aug. 30, 2011, now Pat. No. 8,832,232.

(30) Foreign Application Priority Data

Aug. 31, 2010 (KR) .................. 10-2010-0085092

(51) Int. Cl.
G06F 15/76 (2006.01)
H04L 29/08 (2006.01)
G06F 9/50 (2006.01)
H04L 29/06 (2006.01)

(52) U.S. Cl.
CPC .......... *H04L 67/025* (2013.01); *G06F 9/5055* (2013.01); *H04L 67/303* (2013.01); *H04L 67/306* (2013.01); *H04L 67/42* (2013.01)

(58) Field of Classification Search
CPC ..... H04L 67/306; H04L 67/303; H04L 12/18; H04L 67/025; G06F 2209/483
See application file for complete search history.

(56) References Cited

U.S. PATENT DOCUMENTS 6,687,735 B1 2/2004 Logston et al.
7,149,806 B2 * 12/2006 Perkins ................. G06F 21/335
 709/203
7,882,246 B2 2/2011 Lee
(Continued)

FOREIGN PATENT DOCUMENTS

KR 10-2006-0081159 A 7/2006
KR 10-0869246 B1 11/2008
KR 10-2010-0070563 A 6/2010

OTHER PUBLICATIONS

Korean Search Report dated Jun. 3, 2016.

*Primary Examiner* — Chirag R Patel
(74) *Attorney, Agent, or Firm* — Cha + Reiter, LLC.

(57) ABSTRACT

An application service providing system including: a service server for managing a plurality of applications, determining suitability of a client when a service is provided, and providing an application requested by the client; the client for performing communication with the service server through a wireless network, defining a device identifier in an operating system, and requesting the service server to provide an application service through a profile corresponding to the device identifier; and at least one terminal displaying the application in response to a request by the client.

20 Claims, 3 Drawing Sheets

(56) References Cited

U.S. PATENT DOCUMENTS

| | | | |
|---|---|---|---|
| 8,244,179 B2 * | 8/2012 | Dua | G06F 17/30058 |
| | | | 340/10.51 |
| 8,667,483 B2 * | 3/2014 | Coussemaeker | G06F 8/61 |
| | | | 717/174 |
| 2005/0257212 A1 | 11/2005 | Boyles et al. | |
| 2006/0130053 A1 | 6/2006 | Buljore et al. | |
| 2008/0261526 A1 * | 10/2008 | Suresh | G06Q 30/02 |
| | | | 455/41.2 |
| 2009/0327408 A1 | 12/2009 | Nagase et al. | |
| 2010/0161804 A1 | 6/2010 | Jeon et al. | |
| 2010/0233996 A1 | 9/2010 | Herz et al. | |
| 2010/0330969 A1 | 12/2010 | Kim et al. | |
| 2011/0010704 A1 | 1/2011 | Jeon et al. | |
| 2011/0055355 A1 | 3/2011 | Lee et al. | |
| 2011/0202914 A1 | 8/2011 | Kim et al. | |
| 2011/0213876 A1 * | 9/2011 | Kumar | H04L 67/16 |
| | | | 709/224 |
| 2011/0263296 A1 | 10/2011 | Baietto et al. | |
| 2012/0084773 A1 | 4/2012 | Lee et al. | |

* cited by examiner

METHOD AND APPARATUS FOR PROVIDING APPLICATION SERVICE, AND SYSTEM FOR PROVIDING THE SAME

CROSS REFERENCE TO RELATED APPLICATIONS

This application is a Continuation of U.S. patent application Ser. No. 13/220,820 filed on Aug. 30, 2011 which claims priority under 35 U.S.C. §119 to an application entitled "Method and Apparatus for Providing Application Service, and System for Providing the Same" filed in the Korean Intellectual Property Office on Aug. 31, 2010 and assigned Serial No. 10-2010-0085092, the contents of which are incorporated herein by reference.

BACKGROUND

1. Field of the Invention

The present invention relates generally to an application providing system, and more particularly, to a method and apparatus for providing accessing various application services by using a profile, and a system for providing the same.

2. Description of the Related Art

A mobile terminal has various hardware and software characteristics, which are dynamically and quickly changed by external factors, such as modification according to a mobile communication company, downloads of new application programs, and addition of new input and output devices.

However, a method of managing device information of a current mobile terminal involves managing profile information in a static way.

FIG. 1 is a schematic configuration of an application providing system according to the prior art. As shown, mobile terminals 101, 102, 103, and 104 transmit their device profile information files to the service server 100 in order to request for managing a plurality of applications, and in response, the service server 100 selects and provides only applications corresponding to respective profiles of the mobile terminals 101, 102, 103, and 104. That is, the service server 100 acquires device characteristics of the mobile terminals 101, 102, 103, and 104 by analyzing profiles of each mobile terminals 101, 102, 103, and 104, then selects and provides only applications corresponding to the acquired device characteristics.

Accordingly, when a desired application is not suitable for a profile of a corresponding mobile terminal, an application service cannot be provided to the corresponding mobile terminal. Thus, the mobile terminal in the prior art system may not able to enjoy other application services.

SUMMARY

An object of the present invention is to substantially solve at least the above problems and/or disadvantages and to provide at least the advantages below. Accordingly, the present invention provides a method and apparatus for providing an application service, by which various application services can be provided by receiving a profile of a client, which is required to access a service server, from a nearby terminal and accessing the service server by using a profile of the nearby terminal instead of a static profile of the client, and a system for providing the same.

According to one aspect of the present invention, an application service providing system includes: a service server for managing a plurality of applications, determining suitability of a client when a service is provided, and providing an application requested by the client based on the suitability; the client for performing communication with the service server through a wireless network, defining a device identifier in an operating system, and requesting the service server to provide an application service through a profile corresponding to the device identifier; and at least one terminal, which is connected to the client through a wireless network and displays the application at the request of the client.

According to another aspect of the present invention, an application service providing method includes: receiving profile information per terminal from at least one terminal connected through a wireless network; acquiring a device characteristic of a corresponding terminal by analyzing the received profile information; resetting a static profile of a client to a profile of the corresponding terminal according to the acquired device characteristic; and requesting for an application service by accessing a service server through the reset profile information.

According to yet another aspect of the present invention, an application service providing apparatus includes: a controller for performing an access to a service server by outputting a profile when an application providing request is performed, acquiring a device characteristic of a corresponding terminal by analyzing a profile received from at least one nearby terminal, and controlling to reset a static profile of a client with the acquired device characteristic; and a profile setup unit for temporarily setting the profile input through the controller as the static profile.

BRIEF DESCRIPTION OF THE DRAWINGS

The above features and advantages of the present invention will become more apparent from the following detailed description when taken in conjunction with the accompanying drawing in which.

DETAILED DESCRIPTION

Preferred embodiments of the present invention will be described herein below with reference to the accompanying drawings. In the following description, although many specific items are shown, they are only provided to help general understanding of the present invention, and it will be understood by those of ordinary skill in the art that these specific items can be modified or changed within the scope of the present invention.

The present invention is applicable in an application service providing system of the type having a service server for managing a plurality of applications, a client for receiving the application service from the service server, and at least one nearby terminal connected to the client. The invention allows a terminal to receive an application from a service server where the client requests the service server to provide a particular application service using a profile of the nearby terminal instead of a static profile of the client. The present invention allows the client, which cannot normally perform a download service of various applications since the service server provides only an application corresponding to a specified profile of the client, by using the profile of nearby terminals, to receive various application services from the service server that matches the profile of nearby terminals.

In addition, each of a client and a nearby terminal according to a preferred embodiment of the present invention may be a terminal capable of communicating with a server through a network, and it will be clearly understood by those of ordinary skill in the art that each of the client and the nearby terminal may be applied to all information communication devices, such as a digital broadcast terminal, a Personal Digital Assistant (PDA), a smart phone, a third generation (3G) terminal, e.g., an International Mobile Telecommunication 2000 (IMT-2000) terminal, a Wideband Code Division Multiple Access (WCDMA) terminal, a Global System for Mobile Communication Packet Radio Service (GSM/GPRS) terminal, and a Universal Mobile Telecommunication Service (UTMS) terminal, multimedia devices, and applications thereof.

An application service providing system according to a preferred embodiment of the present invention will now be described with reference to FIG. 2.

Figure 1:
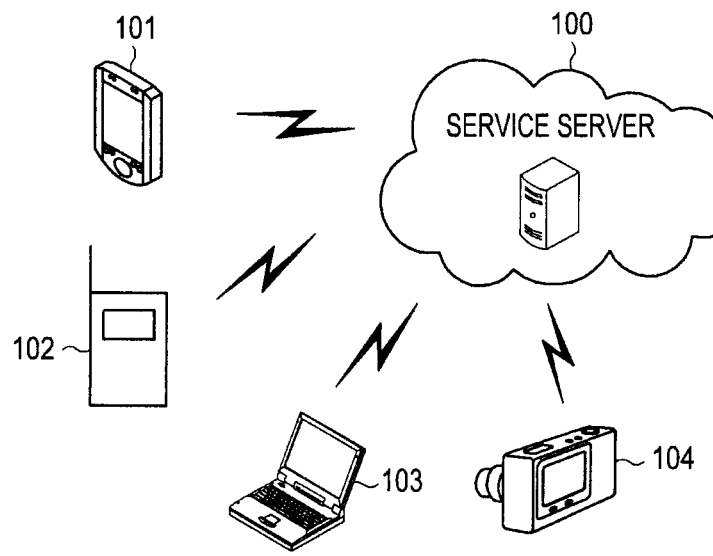
FIG. 1 is a schematic configuration of an application providing system according to the prior art.
Figure 2:
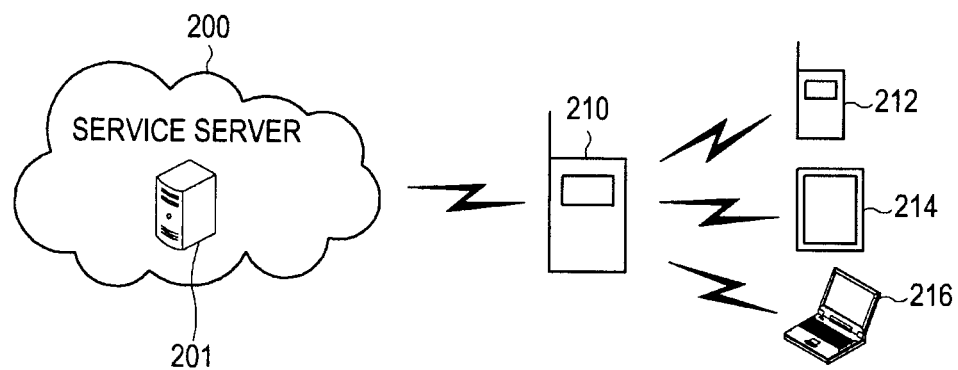
FIG. 2 is a schematic configuration of an application service providing system according to a preferred embodiment of the present invention.

FIG. 2 is a schematic configuration of an application service providing system 200 according to a preferred embodiment of the present invention.

Referring to FIG. 2, the application service providing system 200 to which the present invention is applied includes a service server 201, a client 210 (i.e., a mobile terminal), and nearby terminals 212, 214, and 216 performing communication with the client 210.

In detail, the application service providing system 200 includes the service server 201 for managing a plurality of applications, determining suitability of the client 210 when a service is provided, and providing an application requested by the client 210, and the client 210 for performing communication with the service server 201 through a wireless network, defining a device identifier in an operating system, and requesting the service server 201 to provide an application service through a profile corresponding to the device identifier. The system further includes the terminals 212, 214, and 216, which are connected to the client 210 through a wireless network, and display the application in response to a request of the client 210.

In operation, the suitability of the client 210 is determined by the service provider 201 according to whether the application requested by the client 210 corresponds to a specified profile of the client 210. That is, the service server 201 determines suitability on whether the application requested to be received by the client 201 corresponds to an unique identification information, i.e., a profile, such as an operational parameter of a device, resolution of a display screen, a Central Processing Unit (CPU) type, regional information, an operating system.

In an alternate embodiment, if the service server 201 receives an application service request from a plurality of clients, the service server 201 perceives a device characteristic of each of the clients by parsing a profile transmitted from each of the clients and provides an application corresponding to the perceived device characteristic to each of the clients.

Accordingly, the client 210 performs communication with the service server 201 through a wireless network, defines a device identifier in an operating system, and requests the service server 201 to provide an application service through a profile corresponding to the device identifier. That is, the client 210 acquires a device characteristic of each of the terminals 212, 214, and 216 by parsing a profile provided from each of the terminals 212, 214, and 216, resets a unique static profile of the client 210 to the profile of any one of the terminals 212, 214, and 216 according to the acquired device characteristic from each of the terminals 212, 214, and 216 when an application service request is transmitted to the service server 201, and then accesses the service server 201 through the reset profile. Here, the profile is the unique identification information of the client 210, which is required to access the service server 201 when an application service request is transmitted to the service server 201, and includes an operational parameter of a device, resolution of a display screen, a CPU type, regional information, an operating system, and service provider information. If the static profile of the client 210 is reset to a profile of any one of the terminals 212, 214, and 216, the static profile is temporarily stored in a memory of the client 210, and after an application service is provided from the service server 201, the static profile is recovered as it was.

Each of the nearby terminals 212, 214, and 216 has profile information different from each other and provides its own profile information in response to a request of the client 210. The nearby terminals 212, 214, and 216 are connected to the client 210 through a wireless network and display the application in response to a request of the client 210.

Hereinafter, an application service providing method according to a preferred embodiment of the present invention will now be described with reference to FIG. 3.

Figure 3:
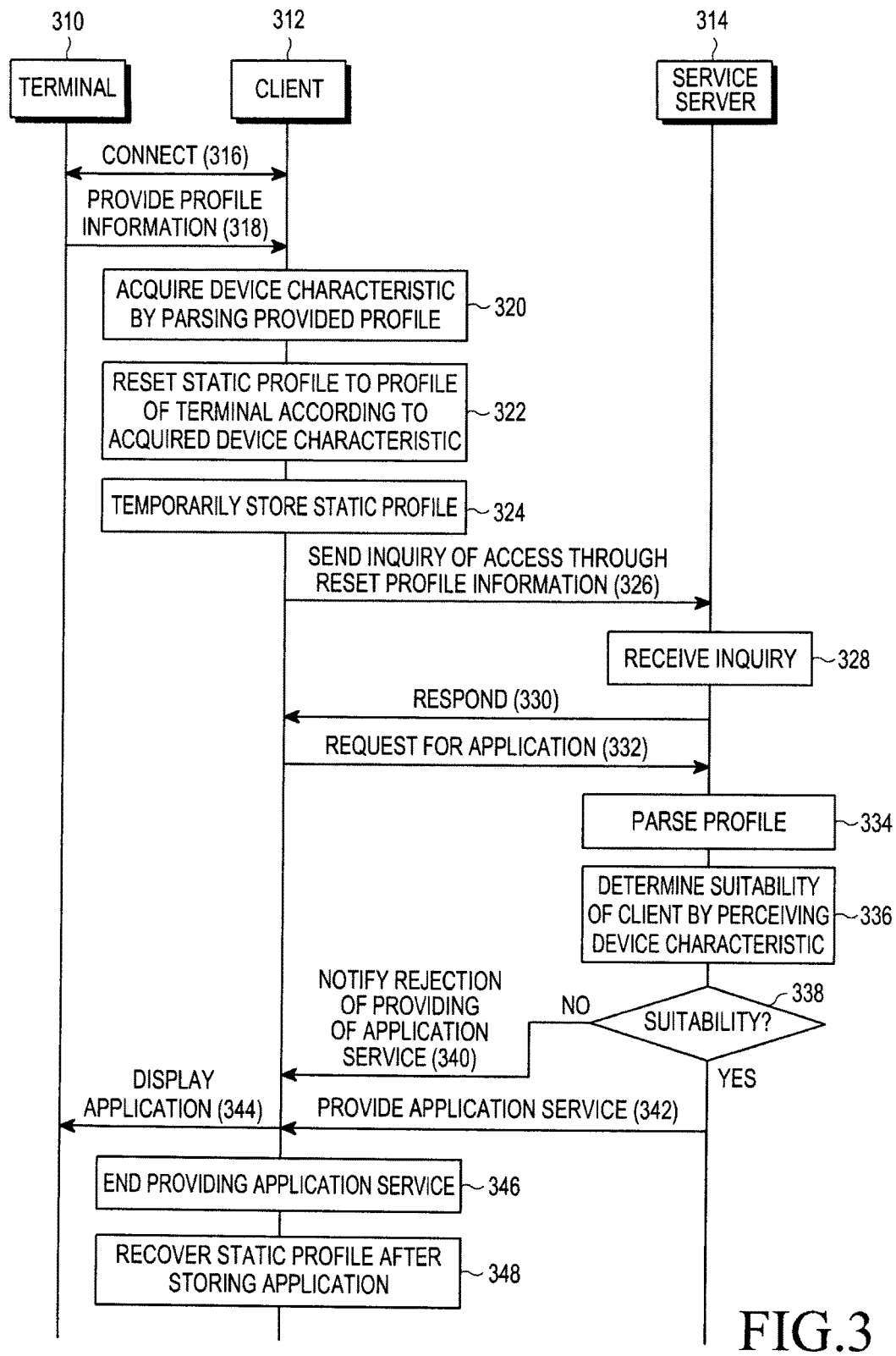
FIG. 3 is a flowchart of an application service providing method according to a preferred embodiment of the present invention.

FIG. 3 is a flowchart of an application service providing method according to a preferred embodiment of the present invention.

Referring to FIG. 3, in step 316, a client 312 is connected to any one of the terminals 310 through a wireless network.

In step 318, the client 312 receives profile information from at least one terminal 310 connected to the client 312 through the wireless network.

In step 320, the client 312 acquires a device characteristic of the terminal 310 by parsing the profile information. In step 322, the client 312 resets a static profile of the client 312 to a profile of the terminal 310 based on the acquired characteristic of the terminal 310.

Here, the profile is unique identification information of the client 312, which is required to access a service server 314 when an application service request is transmitted to the service server 314, and includes an operational parameter of a device, resolution of a display screen, a CPU type, regional information, an operating system, and service provider information.

If the static profile of the client 312 is reset to the profile of the terminal 310 in step 322, the static profile of the client 312 is temporarily stored in a memory of the client 312 in step 324.

In step 326, the client 312 reset to the profile of the terminal 310 accesses the service server 314 with the reset profile. That is, if the client 312 sends an inquiry for an access to the service server 314 by using the reset profile that corresponds to the profile of the terminal 310, the service server 314 transmits a response to the client 312 in step 330 to the inquiry of the client 312 of step 328.

The client 312, which has received a response signal in response to the access from the service server 314 in step 330, requests the service server 314 for an application to be served in step 332.

The service server 314 parses the profile corresponding to the client 312, which has requested for an application service, in step 334. Here, although the client 312 keeps connecting to the service server 314, since the profile parsed by the service server 314 is the profile of the terminal 310 connected to the client 312, the service server 314 recognizes the profile of the terminal 310 as the static profile of the client 312.

In step 336, the service server 314 determines suitability of the requested application by perceiving the device characteristic according to the profile of the client 312. If the requested application is suitable for the profile according to the device characteristic of the client 312 in step 338, the service server 314 proceeds to step 342 to provide a corresponding application service, otherwise the service server 314 proceeds to step 340 to notify the client 312 of rejection of the corresponding application service.

The client 312, which has received the application from the service server 314 in step 342, transmits the application to the terminal 310 so that the application is displayed in the terminal 310 in step 344.

The application service provided by using the profile of the terminal 310 ends in step 346, and simultaneously, in step 348, the application is stored, and the temporarily stored static profile of the client 312 is recovered.

Figure 4:
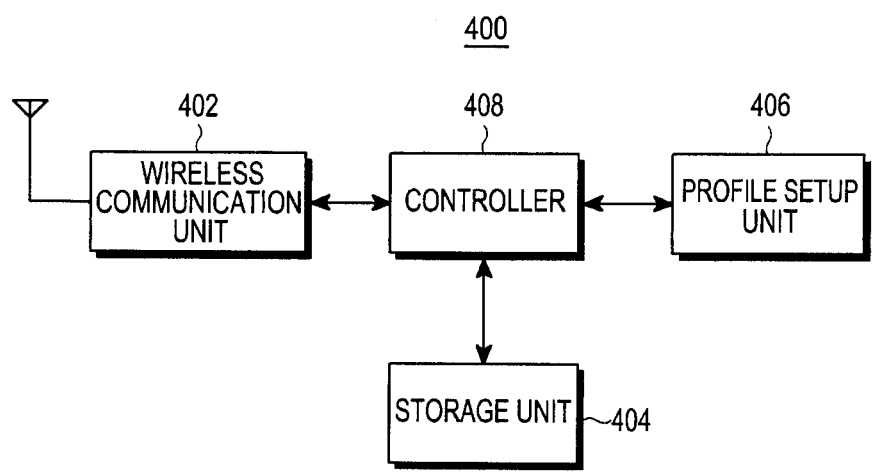
FIG. 4 is a block diagram of an application service providing apparatus according to a preferred embodiment of the present invention.

FIG. 4 is a block diagram of an application service providing apparatus 400 according to a preferred embodiment of the present invention.

Referring to FIG. 4, the application service providing apparatus 400 includes a wireless communication unit 402, a storage unit 404, a profile setup unit 406, and a controller 408.

In operation, the wireless communication unit 402 receives a wireless downlink signal from exterior through an antenna and outputs downlink data obtained by demodulating the wireless downlink signal to the controller 408. In addition, the wireless communication unit 402 generates a wireless uplink signal by modulating uplink data input from the controller 408 and transmits the generated wireless uplink signal to the air through an antenna in a wireless manner. These modulation and demodulation may be performed according to a Code Division Multiple Access (CDMA) method, a Frequency Division Multiplexing (FDM) method, or a Time Division Multiplexing (TDM) method.

The storage unit 404 stores various kinds of information selected by user selection information, user storage information, a plurality of applications according to a preferred embodiment of the present invention, and a static profile of a client, i.e., the application service providing apparatus 400.

The controller 408 performs an access to a service server by outputting a profile in a case of an application providing request and controls to acquire a device characteristic of a corresponding terminal by parsing a profile input from at least one nearby terminal and reset the static profile of the client with the acquired device characteristic.

The profile setup unit 406 temporarily replaces the static profile by a profile input through the controller 408.

That is, when the controller 408 receives profile information from at least one terminal connected through a wireless network, acquires a device characteristic of the corresponding terminal by parsing the received profile, and outputs the acquired device characteristic to the profile setup unit 406.

Then, the profile setup unit 406 resets the static profile of the client with the profile of the corresponding terminal. Accordingly, since the application service providing apparatus 400 receives a profile required to request for an application service from a nearby terminal and accesses the service server by using the profile of the nearby terminal instead of the static profile of its own, the service server providing an application service recognizes the client with the profile of the nearby terminal. In essence, the application service providing apparatus 400 may receive even an application, which cannot be downloaded with only the static profile of the client, by using a profile of a nearby terminal.

Accordingly, during an application service providing request, by requesting for an application by receiving a profile required to access a service server from a nearby terminal instead of a static profile of a client, various application services may be received by accessing the service server with the profile of the nearby terminal.

The above-described methods according to the present invention can be implemented in hardware, firmware or via the execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Operations related to the method and apparatus for providing an application service and a system for providing the same according to preferred embodiments of the invention may be achieved. While preferred embodiments of the invention have been described, various changes or modifications in form and details may be made therein without departing from the scope of the invention as defined by the appended claims and equivalents.

What is claimed is:
1. A method comprising:
   receiving, at a first mobile terminal, from a second mobile terminal external to the first mobile terminal, a profile corresponding to the second mobile terminal and resetting a static profile of the first mobile terminal using at least a portion of the profile received from the second mobile terminal external to the first mobile terminal;
   receiving, at the first mobile terminal, from a server, at least one application executable at the second mobile terminal, according to a determination on the server based on the reset static profile of the first mobile terminal; and
   transmitting, at the first mobile terminal, the at least one application to the second mobile terminal such that the at least one application can be provided via the second mobile terminal and reverting the reset static profile to an original state.

2. The method of claim 1, wherein the profile is received from the second mobile terminal when a distance between the first mobile terminal and the second mobile terminal falls within a specified range, and wherein the reset static profile is reverted when the at least one application is stored in the first mobile terminal.

3. The method of claim 1, wherein the profile comprises at least one of a device identifier, a resolution of a display, a central processing unit type, or an operating system corresponding to the second mobile terminal.

4. The method of claim 1, wherein the receiving the profile comprises:
connecting with the second mobile terminal via a wireless network.

5. The method of claim 1, wherein the receiving the at least one application comprises:
accessing the server with the reset static profile.

6. The method of claim 1, wherein the receiving the at least one application comprises:
requesting the server to provide the first mobile terminal with the at least one application using the reset static profile.

7. The method of claim 1, wherein the receiving the at least one application comprises:
selecting the at least one application among a plurality of applications managed by the server.

8. The method of claim 1, wherein the at least one application is displayed via a display operatively coupled with the second mobile terminal.

9. A mobile terminal comprising:
a communication unit to communicate with an external mobile terminal; and
a controller operatively coupled with the communication unit, the controller configured to:
receive, from the external mobile terminal, a profile corresponding to the external mobile terminal, and reset a static profile of the mobile terminal using at least a portion of the profile received from the external mobile terminal external from the mobile terminal;
obtain, from a server, at least one application executable at the external mobile terminal according to a determination of the server based on the reset static profile of the external mobile terminal; and
transmit the at least one application to the external mobile terminal such that the at least one application can be provided via the external mobile terminal, and reverting the reset static profile to an original state.

10. The mobile terminal of claim 9, wherein the profile is received from the external mobile terminal when a distance between the mobile terminal and the external mobile terminal falls within a specified range, and
wherein the reset static profile is reverted when the at least one application is stored in the external mobile terminal.

11. The mobile terminal of claim 9, wherein the external mobile terminal comprises a nearby terminal to the mobile terminal.

12. The mobile terminal of claim 9, wherein the profile comprises a device identifier corresponding to the external mobile terminal, and wherein the at least one application corresponds to the device identifier.

13. The mobile terminal of claim 9, wherein the controller is configured to:
connect with the external mobile terminal via a wireless network.

14. The mobile terminal of claim 9, wherein the profile is obtained based on a determination that the connection is established.

15. The mobile terminal of claim 9, wherein the controller is configured to:
access the server to request the server to provide the mobile terminal with the at least one application based at least in part on the profile.

16. The mobile terminal of claim 9, wherein the at least one application is displayed via a display operatively coupled with the external mobile terminal.

17. A mobile terminal comprising:
a communication unit to communicate with an external mobile terminal; and
a controller operatively coupled with the communication unit, the controller configured to:
transmit a profile corresponding to the mobile terminal to the external mobile terminal for resetting a static profile of the external mobile terminal using at least a portion of the transmitted profile corresponding to the mobile terminal; and
receive, from the external mobile terminal, at least one application corresponding to the profile, the at least one application transmitted from a server to the external mobile terminal according to a determination based of the server on the reset static profile of the external mobile terminal and in response to a request to provide the external mobile terminal with the at least one application using the reset static profile.

18. The mobile terminal of claim 17, wherein the at least one application is selected among a plurality of applications via the external mobile terminal, and
wherein the reset static profile of the external mobile terminal is reverted when the at least one application is stored in the external mobile terminal.

19. The mobile terminal of claim 17, wherein the profile comprises a device identifier corresponding to the mobile terminal, and wherein the at least one application corresponds to the device identifier.

20. The mobile terminal of claim 17, wherein the controller is configured to:
display the at least one application via a display operatively coupled with the mobile terminal.

* * * * *